(12) United States Patent
Parker

(10) Patent No.: US 11,132,743 B2
(45) Date of Patent: Sep. 28, 2021

(54) WEB-BASED DASHBOARD SYSTEM FOR MULTI-SCALE, MULTI-REGIONAL VISUAL AND SPATIAL ECONOMIC ANALYSIS WITH INTEGRATED BUSINESS OUTREACH

(71) Applicant: Cheryl Parker, Arlington, VA (US)

(72) Inventor: Cheryl Parker, Arlington, VA (US)

( * ) Notice: Subject to any disclaimer, the term of this patent is extended or adjusted under 35 U.S.C. 154(b) by 0 days.

(21) Appl. No.: 16/513,979

(22) Filed: Jul. 17, 2019

(65) Prior Publication Data

US 2020/0058067 A1 Feb. 20, 2020

Related U.S. Application Data

(60) Provisional application No. 62/719,644, filed on Aug. 18, 2018.

(51) Int. Cl.
| | |
|---|---|
| *G06F 3/048* | (2013.01) |
| *G06Q 40/00* | (2012.01) |
| *G06Q 30/02* | (2012.01) |
| *G06F 3/0482* | (2013.01) |
| *G06F 3/0484* | (2013.01) |

(52) U.S. Cl.
CPC ........... *G06Q 40/00* (2013.01); *G06F 3/0482* (2013.01); *G06F 3/04847* (2013.01); *G06Q 30/0205* (2013.01); *G06F 2203/04803* (2013.01)

(58) Field of Classification Search
CPC ...... G06F 16/248; G06F 3/048; G06F 3/0482; G06Q 10/10; G06Q 20/08; G06Q 30/018; G06Q 40/12; G06Q 10/06; G06Q 10/067; G06Q 40/06; G06Q 40/125; H04L 2209/56; H04L 51/16; H04L 51/04; H04L 51/12

See application file for complete search history.

(56) References Cited

U.S. PATENT DOCUMENTS

| | | | |
|---|---|---|---|
| 8,793,610 B2 | 7/2014 | Parker | |
| 8,799,812 B2 | 8/2014 | Parker | |
| 2010/0287512 A1* | 11/2010 | Gan | ........................ G06F 16/26 715/854 |

(Continued)

OTHER PUBLICATIONS

Cyberstate; Comp TIA Properties, LLC; Copyright 2017; 135 pages, https://www.cyberstates.org/.*

(Continued)

*Primary Examiner* — Linh K Pham

(74) *Attorney, Agent, or Firm* — Steven H. Meyer, Esq.

(57) ABSTRACT

An interactive data visualization dashboard visualizes a super-region economy and allows a user to identify companies of interest. The dashboard includes a main region chart portraying main regions in a super-region; a sub-region chart representing sub-regions within the main regions depicted in the main region chart; an industry sector chart of industry sectors that can be drilled down from more generic to more specific levels of industry sector codes; a financial stress chart depicting a financial stress index for the selected region; and a material change chart depicting a material change score for the selected region. The charts are interactive and linked so that a selection of an element in one chart automatically triggers all other charts to redraw based upon the selected element. The selection and redrawing occurs iteratively, and the user interacts with the dashboard to focus and refine until satisfied with the information displayed.

20 Claims, 9 Drawing Sheets

(56) References Cited

U.S. PATENT DOCUMENTS

| | | | | |
|---|---|---|---|---|
| 2011/0191343 | A1* | 8/2011 | Heaton | G16H 50/70 |
| | | | | 707/737 |
| 2011/0261049 | A1* | 10/2011 | Cardno | G06Q 10/10 |
| | | | | 345/419 |
| 2011/0270705 | A1* | 11/2011 | Parker | G06F 16/29 |
| | | | | 705/26.61 |
| 2011/0314403 | A1* | 12/2011 | Yan | G06Q 10/0639 |
| | | | | 715/772 |
| 2014/0006930 | A1* | 1/2014 | Hollis | G06F 3/0482 |
| | | | | 715/234 |
| 2014/0208215 | A1* | 7/2014 | Deshpande | G06Q 10/00 |
| | | | | 715/736 |
| 2015/0120608 | A1* | 4/2015 | Leftwich | G06Q 40/06 |
| | | | | 705/36 R |
| 2016/0364740 | A1 | 12/2016 | Parker | |
| 2018/0285746 | A1* | 10/2018 | Dunwoody | G06Q 50/22 |
| 2018/0285756 | A1* | 10/2018 | Dunwoody | G06N 5/047 |

OTHER PUBLICATIONS

Screen Shot of cyberState; Wayback machine on Apr. 20, 2018; 7 pages; http://web.archive.org/web/20190120023508/https://www.cyberstates.org/.*

Lyer et al.; DataScope: Interactive Visual Exploratory Dashboards For Large Multidimensional Data; Jun. 19, 2021; IEEE; 7 pages.*

Komleva et al.; Evaluation of the Quality of Survey Data and its Visualization Using Dashboards. 2020; IEEE; 4 pages.*

Koehler et al.; Dynamic Collaborative Visualization Ecosystem to Support the Analysis of Large-Scale Disparate Data; 2019; IEEE; 10 pages.*

* cited by examiner

WEB-BASED DASHBOARD SYSTEM FOR MULTI-SCALE, MULTI-REGIONAL VISUAL AND SPATIAL ECONOMIC ANALYSIS WITH INTEGRATED BUSINESS OUTREACH

CROSS-REFERENCE TO RELATED APPLICATION

The present application claims priority from U.S. Provisional Pat. Application No. 62/719,644, filed on Aug. 18, 2018, which is hereby incorporated by reference in its entirety. The present application includes subject matter that relates to the subject matter disclosed in U.S. patent application Ser. No. 15/067,362, filed on Mar. 11, 2016, and entitled "System and Method for Economic Analytics and Business Outreach, Including Layoff Aversion", hereby incorporated by reference in its entirety, published as U.S. Patent Pub. No. 2016/0364740, now issued as U.S. Pat. No. 10,380,616. Also, the present application includes subject matter that relates to the subject matter disclosed in U.S. Pat. Nos. 8,793,610 and 8,799,812, both of which are hereby incorporated by reference in their entirety.

FIELD

The present disclosure relates to performing web-based mapping services and functions. More particularly, the present disclosure relates to performing such mapping services and functions for State, Regional and Federal administrators working in economic development, workforce development, regional planning and disaster recovery, and the like. Specifically, the present disclosure relates to performing such mapping services and functions in order to allow such administrators to understand how to strategically and effectively allocate limited staff and other resources to assist key companies in a defined region which may be on the verge of layoffs due to any number of factors, including financial stress and natural disasters.

BACKGROUND

In order for one of the aforementioned administrators to understand how to strategically and effectively allocate limited staff and other resources to assist key companies in a defined region which may be on the verge of layoffs, a key decision-making tool is having a comparative regional understanding. In particular, the administrator needs to know whether a financial stress across industry sectors in their locality is unique, or if it is shared among surrounding regions. In addition to this cross-regional comprehension, the administrator needs to be able to think across scales in order to direct and coordinate with administrators from other regional jurisdictions, agencies, and local staff who are doing business outreach.

As an example of workflow performed by such a decision-making tool, such administrator routinely needs to monitor which industry sectors are regionally-specialized and growing in a local economy. In doing so, the administrator can plan future investment in growing the local workforce, and also assist key companies in key sectors to avert layoffs. To do this effectively, the administrator needs to see how their local economy is faring relative to other neighboring economies such that they can truly understand the significance of a sector in their locality as well as its financial health/stress across time. This type of comparative regional understanding helps the administrator to pinpoint and target specific businesses with the correct type of assistance to help such businesses grow, to assist such businesses in averting layoffs, and to partner with such businesses and educators to identify and hone skill sets within the local population for emerging occupations.

A similar workflow should also be performed for a regional administrator who may have recently experienced some type of natural disaster, such as for example a wildfire, which carves out its own specific boundaries that may cut across various regional jurisdictions. In order to effectively coordinate business outreach workflow across the several jurisdictions, local decision-makers need to be able to understand how the natural disaster area sits within a sub-region and how that sub-region relates to its parent super-region. In addition, the administrator needs to be able to comprehend the financial health of the natural disaster area across a period of time, such as for example pre- and post-disaster, relative to the other regional and super-regional economies, both to determine how the local region is affected and to understand how the natural disaster is interconnected with and affects various surrounding regions.

For both workforce development administrators and natural disaster administrators, an integrated interactive data visualization dashboard which provides the ability to get a cross-scale, multi-regional comparison of the health of the economy of a designated super-region across time would be beneficial to making key policy decisions within a relatively narrow timeframe. Furthermore, such a decision-making tool would enable quick identification of key businesses which could benefit from targeted outreach and assistance and thereby prevent layoffs.

Presently, there is no system and method that provides a cross-scale, cross-regional, cross-time, multi-industry sector financial health visual/statistical comparison across a super-region, such as for example a State, based on regions therein, such as for example the counties of the State. While there are open-source Javascript code libraries and do-it-yourself software products for interactive data and map-based visualization, these are simply stand-alone individual components that have not been integrated into an overall system for operating an interactive dashboard, and at any rate key features of such overall system are not presently available.

For example, the open-source D3 ("Data-Driven Documents") JavaScript library is an Interactive Data Visualization (IDV) script library for creating client-side web-based interactive charts and graphs which are dynamically-generated based upon a connection with a database. Both Tableau, by Tableau, Inc., and Power BI, by Microsoft, Inc., are examples of data visualization software packages which are built upon the D3 JavaScript library. Each provides the ability to connect to a data source and produce an interactive data visualization chart/graph in a developer interface that allows a user to drag and drop pre-made IDV components without the need to write raw Javascript or SQL (Structured Query Language) code.

In a similar manner, the open-source LeafletJS GIS (Geographic Information System) Javascript library is a code library for dynamically generating client-side web-based maps or GIS analysis based upon a database connection. Furthermore, GIS companies like ESRI (Environmental Science Research Institute) of Redlands, Calif. provide GIS software which provides a user with the capability to connect an interactive map to a data source and thereby visualize data on an interactive map.

That said, a need exists for a system and method for providing an enhanced web-based mapping interface that facilitates a data-backed decision-making framework. In particular, a need exists for such a system and method which simultaneously manages the decision-making workflow from super-regional administrators, regional administrators, and even on-the-ground local staff who are knocking on the doors of affected businesses. Specifically, a need exists for an integrated interactive data visualization dashboard which provides the ability to get a cross-scale, multi-regional comparison of the health of the economy of a designated super-region across time for use by all such individuals.

SUMMARY

The aforementioned needs are satisfied by a system and method in which a computing system provides an enhanced web-based mapping interface that facilitates a data-backed decision-making framework. In the system, a computing device includes a display and a processor operating based on data in a memory. An interactive data visualization dashboard is instantiated in the memory and shown in the display, where the dashboard visualizes a super-region economy and allows a user to for example identify companies of interest. The dashboard accesses information from a database containing all companies in the super-region and for each company therein information therefor including employment, salaries, and location information.

The dashboard includes a user-actuatable control for allowing a user to select a desired super-region/main-region/sub-region relationship to be portrayed in the dashboard; a main region chart portraying main regions in a super-region; a sub-region chart representing sub-regions within the main regions depicted in the main region chart; an industry sector chart of industry sectors that can be drilled down from more generic levels of industry sector codes to more specific level of industry sector codes; a financial stress chart depicting a financial stress index for the selected region; and a material change chart depicting a material change score for the selected region. All of the charts are interactive and linked to each other so that a selection of an element in one chart automatically triggers all other charts to redraw based upon the selected element. The selection of an element and redrawing the charts based thereupon occurs in an iterative manner, whereby the user interacts with the dashboard in an effort to focus and refine until the user is satisfied with the information displayed.

BRIEF DESCRIPTION OF THE DRAWINGS

The foregoing summary as well as the following detailed description of various embodiments of the present innovation will be better understood when read in conjunction with the appended drawings. For the purpose of illustrating the various embodiments of the innovation, there are shown in the drawings embodiments that are presently preferred. As should be understood, however, the innovation is not limited to the precise arrangements and instrumentalities shown. In the drawings.

DETAILED DESCRIPTION OF PREFERRED EMBODIMENTS

Figure 1:
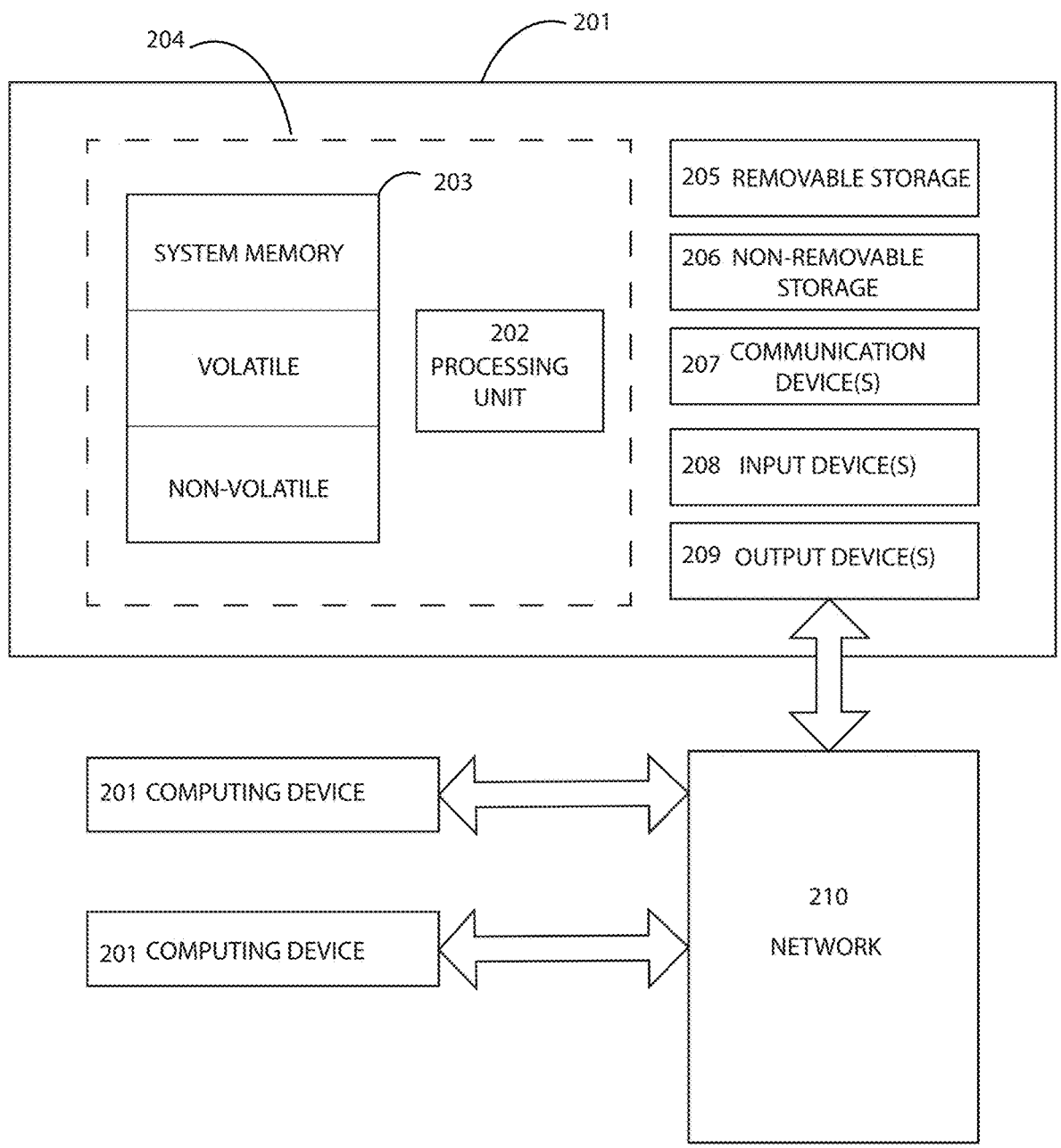
FIG. 1 is a block diagram of an example of a computing environment within which various embodiments of the present innovation may be implemented.

Certain terminology may be used in the following description for convenience only and is not limiting. The words "lower" and "upper" and "top" and "bottom" designate directions in the drawings to which reference is made. The terminology includes the words above specifically mentioned, derivatives thereof and words of similar import.

Where a term is provided in the singular, aspects described by the plural of that term are also contemplated. As used in this specification and in the appended claims, the singular forms "a", "an" and "the" include plural references unless the context clearly dictates otherwise, e.g., "a tip" includes a plurality of tips. Thus, for example, a reference to "a method" includes one or more methods, and/or steps of the type described herein and/or which will become apparent to those persons skilled in the art upon reading this disclosure.

Unless defined otherwise, all technical and scientific terms used herein have the same meaning as commonly understood by one of ordinary skill in the relevant art. Although any methods and materials similar or equivalent to those described herein can be used in the practice or testing of the present innovation, the preferred methods, constructs and materials are now described. All publications mentioned herein are incorporated herein by reference in their entirety. Where there are discrepancies in terms and definitions used in references that are incorporated by reference, the terms used in this application shall have the definitions given herein.

Example Computing Environment

FIG. 1 is set forth herein as an exemplary computing environment in which various embodiments of the present innovation may be implemented. The computing system environment is only one example of a suitable computing environment and is not intended to suggest any limitation as to the scope of use or functionality. Numerous variations of general purpose and special purpose computing system environments or configurations may be used. Examples of well-known computing systems, environments, and/or configurations that may be suitable for use include, but are not limited to, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, one system for implementing aspects described herein includes a computing device, such as computing device 201. In its most basic configuration, computing device 201 typically includes at least one processing unit 202 and memory 203. Depending on the exact configuration and type of computing device, memory 203 may be volatile (such as random access memory (RAM)), non-volatile (such as read-only memory (ROM), flash memory, etc.), or some combination of the two. This most basic configuration is illustrated in FIG. 1 by dashed line 204. Computing device 201 may have additional features and functionality. For example, computing device 201 may include additional storage (removable and/or non-removable) including, but not limited to, magnetic or optical disks or tape. Such additional storage is illustrated in FIG. 1 by removable storage 205 and non-removable storage 206.

Computing device 201 typically includes or is provided with a variety of computer-readable hardware media. Computer-readable media can be any available media that can be accessed by computing device 201 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 203, removable storage 205, and non-removable storage 206 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other computer-readable hardware medium which can be used to store the desired information and which can accessed by computing device 201. Any such computer storage media may be part of computing device 201.

Computing device 201 may also contain communications connection(s) 207 that allow the device to communicate with other devices 201. Each such communications connection 207 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection (including VoIP), and wireless media such as acoustic, radio frequency (RF), infrared and other wireless media. The term computer-readable media as used herein includes both storage media and communication media.

Computing device 201 may also have input device(s) 208 such as keyboard, mouse, pen, voice input device, touch input device, etc. Output device(s) 209 such as a display, speakers, printer, etc. may also be included. In the present disclosure, it is contemplated that the touch input device is incorporated in the display in a manner that is generally known to the relevant public. All these devices are generally known to the relevant public and therefore need not be discussed in any detail herein except as provided.

Notably, computing device 201 may be one of a plurality of computing devices 201 inter-connected by a network 210, as is shown in FIG. 1. As may be appreciated, the network 210 may be any appropriate network, each computing device 201 may be connected thereto by way of a connection 207 in any appropriate manner, and each computing device 201 may communicate with one or more of the other computing devices 201 in the network 10 in any appropriate manner. For example, the network 210 may be a wired or wireless network within an organization or home or the like, and may include a direct or indirect coupling to an external network such as the Internet or the like. Likewise, the network 210 may be such an external network.

Particularly in the case where the network 210 is an external network, such network 210 may be a digitally based network (including VoIP) for exchanging computer data among the devices 201, may be an audio and/or video network for exchanging audio and/or video data among the devices 201, or the like. Thus, it may be that the network 210 may be a public switched telephone network for landline telephone communications, a mobile switching center for wireless telephone communications, a paging network for distributing paging information, a private multimedia network for establishing videoconferencing, or the like. Thus, it should be appreciated, that one or more of the computing devices 1 that are shown to the left of the network 210 in FIG. 1 may be a mobile telephone, a landline telephone, a pager, a mobile electronic mail device, a desktop electronic mail device, a mobile electronic texting device, a desktop electronic texting device, or a combination thereof, or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 210 or a distributed computing environment. Still further, aspects of the presently disclosed subject matter may be implemented in or across a plurality of processing chips or devices, and storage may similarly be effectuated across a plurality of devices in a network 210. Such devices might include personal computers, network servers, and handheld devices, for example.

Overview

Figure 2:
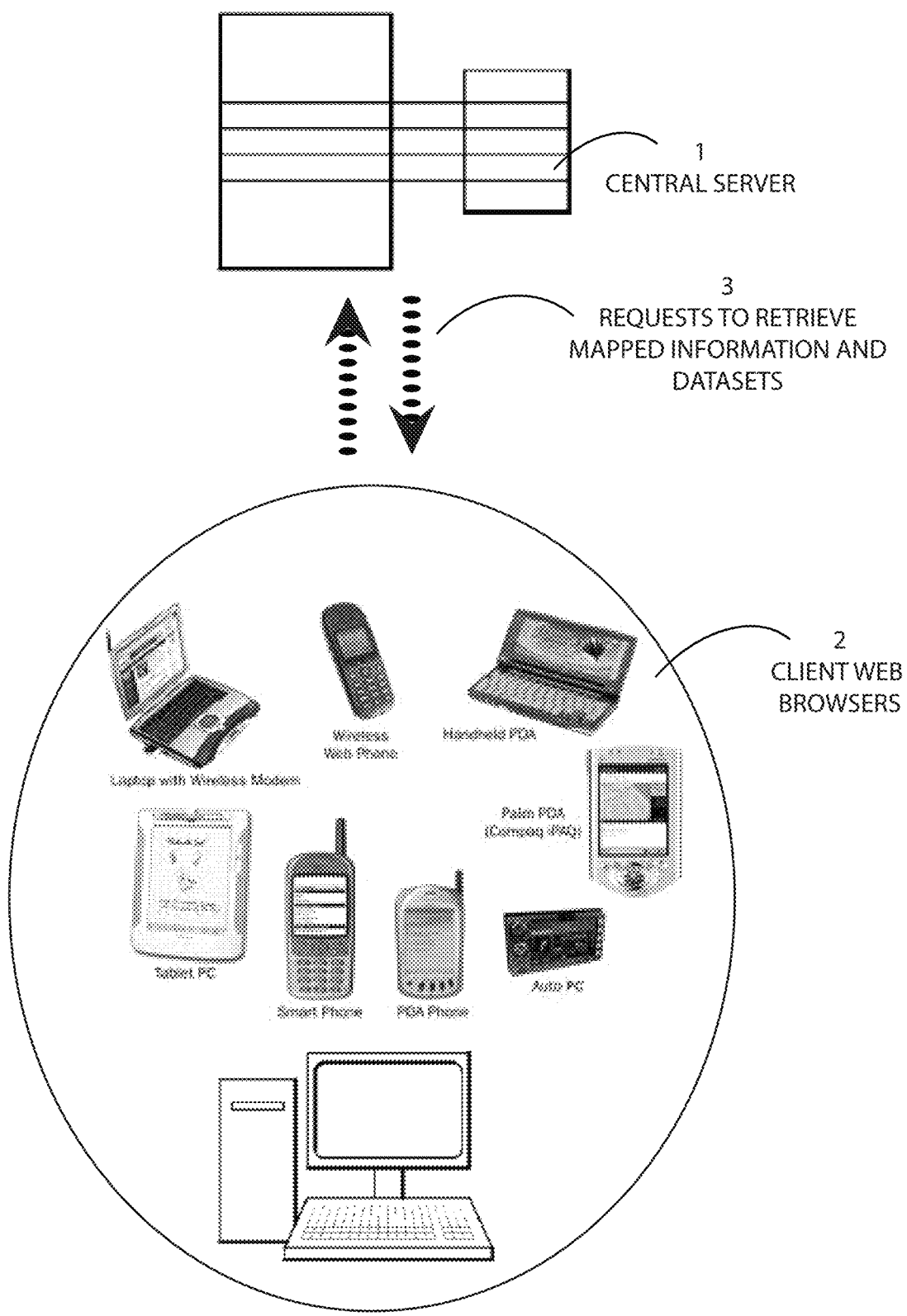
FIG. 2 is a block diagram of a central server and a variety of computing devices.

Turning now to FIG. 2, it is seen that the present innovation may be implemented by way of a central server 1 or the like and is available as a fully functioning software and/or hardware system available via most any web browser 2 or the like. All major databases for the system may reside on the central server 1 and are passed to the client web browser 2 via a high-speed Internet connection or the like. More precisely, client-side scripts from the web browser 2 send requests 3 to the central server 1 to retrieve information for maps, businesses, demographics, and other statistics which are to be displayed through the web browser 2.

Figure 3:
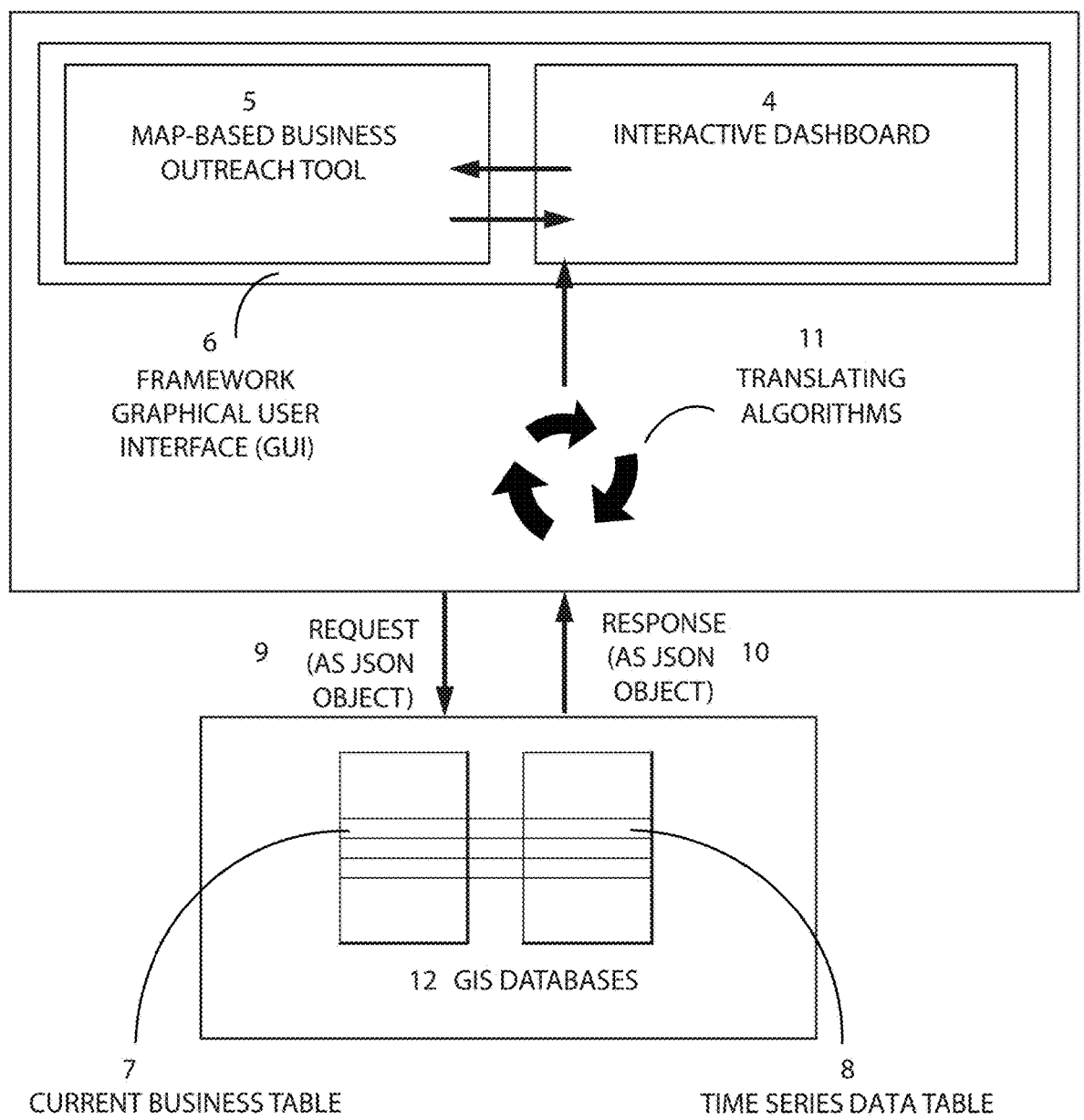
FIG. 3 is a block diagram of major system components in various embodiments of the present innovation.

Referring to FIG. 3, the present innovation features two integrated apps: an Interactive Data Visualization (IDV) dashboard 4 for visualizing a super-region economy and an integrated map-based Business Outreach app 5. A user navigates back-and-forth between the apps to quickly identify and probe each company which may be at risk of failure or else on a growth trajectory, among other things, all within the context of a cross-time understanding of the company's standing within its regional economy relative to that of all other regions across an entire super-region.

Both apps 4, 5 may reside in an overall framework 6, which may include a number of additional apps. Both apps 4, 5 also connect to an underlying business table 7 which contains all companies in a defined super-region. Though business table 7 may be most any appropriate database without departing from the spirit and scope of the present innovation, in various embodiments business table 7 is a database from Dun & Bradstreet (D&B) of Short Hills, N.J., which includes scores measuring each company's and region's projected 'financial health', including a 'Financial Stress Score' as computed by D&B as measured relative to a 'financial state', per a 'Material Change Score' which is also computed by D&B. As shown in FIG. 3, the business table 7 is supplemented by a time-series data table 8 of employment, business counts, salaries, and location quotients, summarized by six-digit NAICS code, sub-region and year.

The underlying database tables 7, 8 are accessed by Structured Query Language (SQL) queries via criteria sent as one or more Javascript Object Notation (JSON) objects 9 as sent from the IDV Dashboard 4 residing in a user's browser or the like. The retrieved information is sent back to the user's browser as one or more JSON objects 10, which then form the basis for algorithms 11 that further refine and translate the JSON objects 10 into interactive charts, graphs, tables and maps to be displayed in the IDV Dashboard 4.

All data tables 7, 8 are contained in one or more Geographical Information System (GIS) relational databases 12 which are organized by super-region. GIS ties all data to geography while the relational database 12 relates all data sets to one another.

General Layout of GUI

Figure 4:
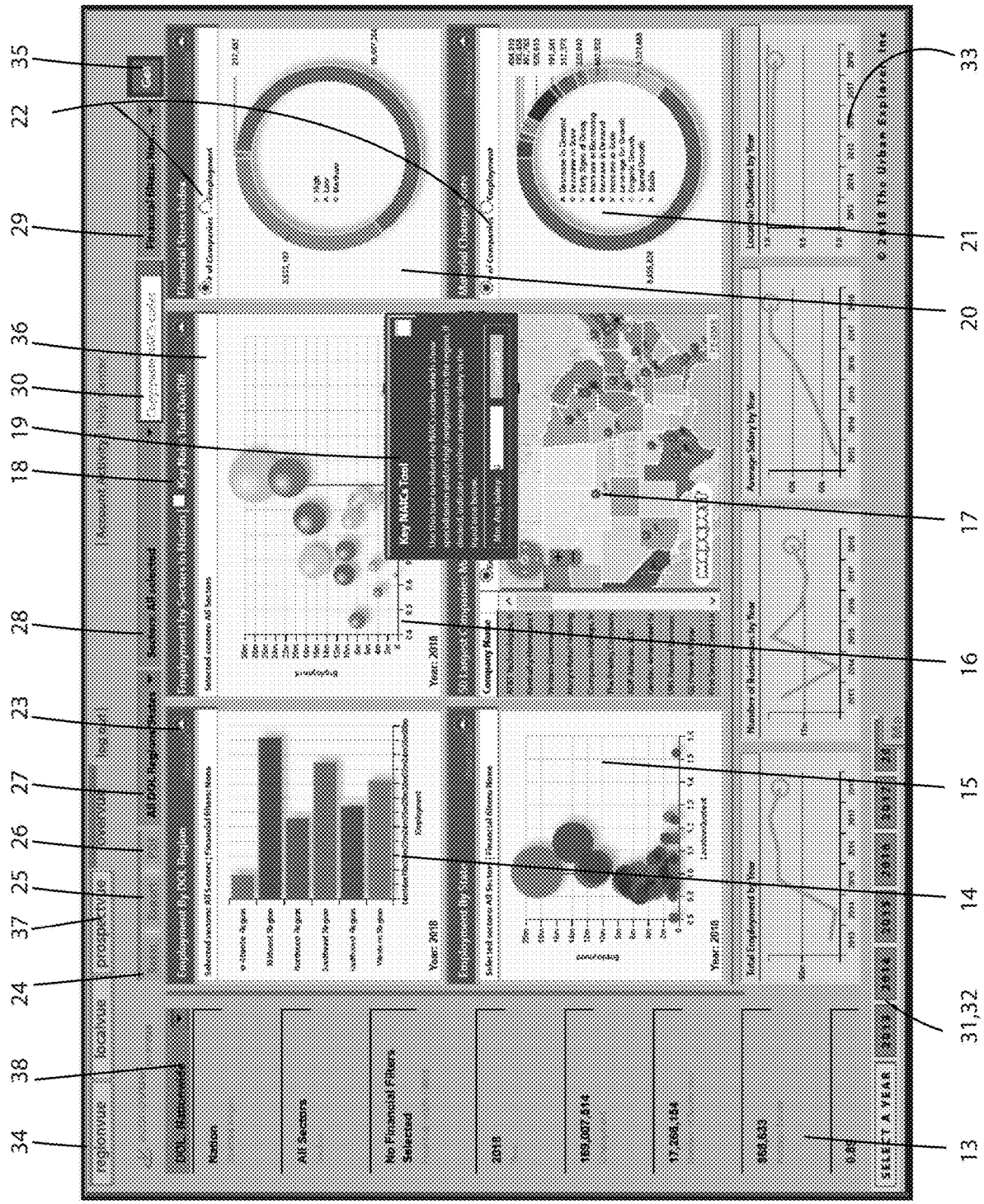
FIG. 4 is a block diagram illustrating the major features and layout associated with an IDV Dashboard in various embodiments of the present innovation.

Referring to FIG. 4, the web-based IDV Dashboard 4 is shown to be arranged into several columns and rows of interlocked views (or "panes") and related controls. While the IDV Dashboard 4 may have most any particular arrangement without departing from the spirit and scope of the present innovation, it has been found that the arrangement as shown is especially aesthetically pleasing and ergonomically useful while presenting the information therein in a logical manner. As seen, the left column 13 of the IDV Dashboard 4 provides an ongoing aggregated summary of whatever sectors (box 28), regions (box 27) and financial health criteria (box 29) might be selected. Specifically, this aggregated summary 13 includes the specific regions, sectors, financial filters and year that are selected in the course of performing an analysis, the aggregated sum of employment and businesses in such selection, and the average salary and location quotient for such selection.

The next column over has two rows featuring stacked panes 14, 15 pertaining to regions. The top pane 14 contains a Main Region Bar Chart portraying the main regions in a super-region, with each bar therein representing a main region and the amount of employment in such main region. The bottom pane 15 is a Sub-Region Bubble Chart representing the sub-regions within the main regions depicted in the pane 14 up above. Each bubble is a sub-region, and the size of the bubble and also the relative elevation within pane 15 illustrates the amount of sub-regional employment for the sub-region, while the lateral position in the pane 15 denotes each sub-region's location quotient or "regional specialization". The sub-regions/bubbles 15 are color-coordinated with the Main Region Bar Chart of pane 14 for ease of reference.

Note here that a 'location quotient' as employed herein is a statistic which relays the comparison of a sub-region's share of industry sectoral employment relative to that of the super-region of such sub-region. Specifically, the share of a sector's employment in the sub-region is divided by the share of employment by that same sector in the super-region thereof. Accordingly, a location quotient of "1.0" means that the sub-region and super-region have an identical share of employment in that particular sector. A location quotient which is greater than "1.0" designates that the sub-region has a greater share of employment in that sector relative to the super-region. Likewise, a location quotient of less than "1.0" designates a smaller relative share. When the location quotient is greater than "1.0", this is also interpreted as the sub-region having a greater "specialization" in that sector relative to the greater super-region. Greater specialization is a positive in that opportunities for employment in the relevant sector are greater in the relevant sub-region, but also a negative in that adverse economic events in the relevant sector affect the relevant sub-region more severely.

In the Sub-Region Bubble Chart 15, each sub-region is assigned an overall average of location quotients across all sectors. The sub-regions which have a high average location quotient contain a large amount of employment across sectors which have high specialization relative to the super-region. In the Sub-Region Bubble Chart 15, the sectoral employment of the super-region is depicted by a black line drawn at the location of "1.0" on the x-axis. Sub-regions, depicted as bubbles, are positioned to the right of this line if the average location quotient across all sectors in each sub-region is greater than "1.0". The sub-region bubbles appear to the left of this line if the average location quotient for the sub-region is less than "1.0". Visual representation in this manner makes it easy to comprehend where sub-regions fall within the spectrum of employment and specialization relative to all other sub-regions at a specific point in time for any specific mix of sectors per designated financial health indicators.

The next column over has two rows featuring stacked panes 16, 17 pertaining to industry sectors. The top pane 16 depicts an Industry Sector Bubble Chart of industry sector bubbles that can be drilled down, from the two-digit NAICS Code level down to the six-digit NAICS Code level. In pane 16, each bubble represents a sector of a selected region, the size and elevation of the bubble depicts the amount of employment in the sector within the region, and the horizontal location of the bubble depicts the specialization of that sector in that region as specified by the location quotient of that sector. The bottom pane 17 contains a combined interactive map and list depicting the fifty largest companies matching the input criteria. A link 18 to the "Key NAICS Tool" is found at the top of pane 16, and opens the Tool in a dialog box 19. The tool 19 prompts the user to enter a desired average salary to input into a related algorithm.

The far-right column has two rows featuring stacked panes 20, 21 pertaining to the financial health of a selected region. The top pane 20 contains a Financial Stress Ring Chart depicting the D&B "Financial Stress Index" for the selected region, and in particular illustrates the number of companies and employment that fall within the categories of low, medium or high financial stress as defined by such Index. The bottom pane 21 contains a Material Change Ring Chart depicting the D&B "Material Change Score" for the selected region, and illustrates the number of companies and employment distributed across the categories of contracting, growing or stable as defined by such Score. The Material Change Score is a measure of the current financial status of companies, while the Financial Stress Index is a measure of the projected status of companies. Radio buttons 22 at the top of each pane 20, 21 enable a user to toggle between the ring chart graphic representation within the respective pane 20, 21 of either total companies or employment falling into the various financial categories.

Each of the aforementioned panes containing charts for regions (panes 14, 15), sectors (panes 16, 17) or financial health (panes 20, 21) also contains a toggle 23 which enables the user to switch between a display of a chart (panes 14, 15, 16, 20, 21) or a map (pane 17), and the underlying raw data from which the chart or map was produced. Such raw data may for example be displayed in a table.

Still referring to FIG. 4, the top row of the IDV Dashboard 4 comprises a series of controls. A Geographical Scale Selector Control 38 is a drop-drown list selector which enables a user to select the desired super-region/main-region/sub-region relationship to be portrayed in the IDV Dashboard 4. The adjacent three buttons include a Reset Control 24, a Worksheet Export Control 25 and a PDF Export Control 26. These buttons are followed by a series of drop-down filter controls, including multi-select filters for regions (box 27), sectors (box 28) and financial information (box 29). A NAICS Text Input Box 30 aligns with these multi-select filters (boxes 27, 28, 29), and enables a user to copy/paste a string of NAICS Codes. The bottom row of the IDV Dashboard 4 contains an interactive timeline 31, with each button 32 representing a temporal element such as a year, sorted chronologically. Clicking a year button 32 causes the IDV Dashboard 4 to redraw all elements 13, 14, 15, 16, 17, 20, 21, 33 therein, so as to graphically and statistically depict the relevant information according to the selected timeframe. The row just above the interactive timeline 31 features a series of linear time graphs 33 depicting how any particular selection fares across time in any selected region per the number of businesses, amount of employment, average salary and average location quotient.

The IDV Dashboard 4 as shown in FIG. 4 can be used by itself to develop information and to perform data analysis, and also can be integrated within a Platform 6 of apps, as is seen in FIG. 3. If so integrated, the other apps of the platform 6 can be launched via the "App Launch Buttons" 34 at the top of the IDV Dashboard 4 (FIG. 4).

Specific Operation of IDV Dashboard 4
Interlocking/Interactive Panes

The IDV Dashboard 4 is composed of a series of interlocked, interactive panes which contain charts, graphs and maps 14, 15, 16, 17, 20, 21, 33. All panes 14, 15, 16, 17, 20, 21 in the IDV Dashboard 4 are interactive and linked to all other panes 14, 15, 16, 17, 20, 21. Accordingly, the selection of an element in any pane 14, 15, 16, 17, 20, 21 automatically triggers all other panes 14, 15, 16, 17, 20, 21 to redraw based upon the selected element(s). For example, selecting any region in a bar chart 14, bubble chart 15, 16, list or map 17, or table 23, or automatically triggers algorithms 11 that recalculate all statistics pertaining to the totals of businesses and employment and average salaries/location quotients as distributed across sectors and financial health indexes across time for that region. These recalculated statistics are then graphically displayed via the animated redrawing of all charts 14, 15, 16, time graphs 33, tables 23 and maps 17 in the IDV Dashboard 4. Selecting any element in this manner also automatically retrieves from the GIS databases 12 the fifty largest companies matching the selected criteria and illustrates them on the interactive map 17. Notably:

Selecting a bar (region) in the Main Region Bar Chart 14 redraws the Sub-Region Bubble Chart 15 such that just the sub-regions contained in the selected region are isolated in the Sub-Region Bubble Chart 15. The selected region is simultaneously selected and focused upon on the map 17. The Region Filter Box 27 also dynamically re-selects to mirror whatever gets chosen in the Main Region Bar Chart 14. Clicking on the same bar which has already been selected in pane 14 triggers an IDV Dashboard "reset" for all regions in the entire super-region, with all sub-region bubbles being portrayed in the Sub-Region Bubble Chart 15.

Selecting a bubble (sector) in the Sector Bubble Chart 16 drills into the selected sector, prompting a redraw of the Sector Bubble Chart 16 as the next level of disaggregation. Accordingly, selecting a two Digit NAICS bubble prompts a redraw for the associated three Digit NAIC subsectors, clicking a three Digit NAICS bubble prompts a redraw for the associated four Digit NAICS sub-sub-sectors, etc. To navigate from a finer NAICS Code disaggregation to one which is more aggregated, such as from a six Digit NAICS to a two Digit NAICS, a user clicks an associated radio button 36 at the top of the Sector Bubble Chart 16 which then retrieves and redraws the more aggregated display of NAICS Code data in pane 16. The Sector Filter Box 28 also dynamically re-selects to mirror whatever gets chosen in the Sector Bubble Graph 16.

Selecting a region on the Interactive Map 17 dynamically selects the associated region bar and sub-region bubble(s) in the Main Region Bar Chart 14 and Sub- Region Bubble Chart 15, respectively. The Region Filter Box 27 also dynamically re-selects to mirror whatever gets chosen on the Interactive Map 17.

Selecting a segment on either of the Financial Health Ring Charts 20, 21 prompts the automated redrawing of the companion ring chart 20, 21, redistributing all segments based upon the chosen segment. The Financial Health Filter Box 29 also dynamically re-selects to mirror whatever gets chosen on the Financial Health Ring Charts 20, 21.

Selecting a super-region in the Geographical Scale Selector list 38 prompts a data retrieval query pulling data from the database 10 for the current year, summarized at the super-region level. Upon retrieval of the data the IDV Dashboard 4 is redrawn to reflect same. The IDV Dashboard 4 is rendered at the highest level, with no selected regional (box 27), sectoral (box 28), NAICS Code (box 30) or financial information (box 29) filters, showing a summary for all major sectors at the super-region level.

Multi-Select Filter Boxes

Region Filter Box 27, Sector Filter Box 28, and Financial Health Filter Box 29 are interactive multi-select filter boxes wherein a user may dynamically filter by financial health of an entire region, per any unique combination of industry sectors and/or sub-regions. Upon selecting the regions(s) (box 27) and sector(s) (box 28) to examine, the user may also select from one or more "Financial Health" indicators 29, gauging the projected financial stress (low, medium, high) of a region's sectors combined with one or more indicators showing the current health of those sectors (growing, contracting, remaining stable).

To elaborate on these Financial Health indicators, both a Financial Stress Index and a Material Change Score are assigned to every company in the D&B database and are continually updated. The Index and the Score for each company are derived based on the financial transactions that a company has with its suppliers. The Financial Stress Index measures the amount of stress the company is experiencing as measured by the number of late payments, UCC filings (denoting the amount of collateral tied to loans), and the like. The Material Change Score indicates whether the financial transactions of the company are related to behaviors associated with growth, such as hiring new staff, purchasing equipment, etc., or contraction, such as decreasing in size, a decrease in demand for products, etc. In the IDV Dashboard 4, upon inputting the desired financial health indicator criteria, such as a combination of "Medium" and "High" Financial Stress plus Material Change showing "Decrease in Scale" and "Decrease in Demand", the aggregate number of companies and employment are dynamically calculated for all companies in the designated region.

The results of the calculation yield the total number of companies and employment meeting the chosen filtered criteria from Box 29 for those specific sectors from Box 28 in the specified ad hoc region(s) from Box 27 across time. The dynamically calculated aggregate average salary and location quotient relating thereto are also portrayed in a linear time graph 33. These charts 14, 15, 16, 20, 21, graphs 33, and tables 23 enable the user to understand the financial health dynamics of an industry sector to understand if it is a growing and emerging sector or if it is in decline.

One-Button Exported Reports

The user may extract data via either of two buttons 25, 26. Specifically, button 25 dynamically produces a multi-page PDF report based on the current state of the IDV Dashboard 4, while button 26 dynamically produces a multi-page Excel Workbook based on such current state. The PDF report is a Super-Region Economic PDF Report, and is a multi-page rendering capturing screenshots of all charts 14, 15, 16, 20, 21, graphs 33, tables 23 and maps 17 from the Dashboard 4, with each page dedicated to regions, sectors, financial health, and number of businesses across time 33. The Excel Workbook is a Super-Region Economic Report, and is a multi-sheet rendering with each sheet dedicated to the breakdown of the statistics associated with charts 14, 15, 16, 20, 21 and graphs 33.

NAICS Input Text Box

The North American Industry Classification System (NAICS) was developed under the auspices of the U.S. Office of Management and Budget (OMB) as the standard for use by Federal statistical agencies in classifying business establishments for the collection, analysis, and publication of statistical data related to the business economy of the U.S. An NAICS Code contains up to six numbers and designates the industry sector that a company belongs to. Every company record in the D&B business database is assigned a six-digit NAICS Code, thereby enabling SQL selection and retrieval from the D&B database via one or more designated NAICS codes/industry sectors.

In the Dashboard 4, a user is able to enter a string of NAICS Codes into a NAICS Input Text Box 30 and, upon executing button 35, triggers the Dashboard 4 to recalculate and redraw all statistics and graphics based upon the selection of the entered NAICS Codes. The left column summary 13, regions panes 14, 15, financial health panes 20, 21 and time graphs 33 as redrawn all display the aggregated employment/company totals for the entered NAICS Codes. The Industry Sector Bubble Chart 16 displays each entered NAICS Code as a bubble therein, where the bubble depicts the amount of employment and the location quotient relating to the NAICS Code by the size and position of the bubble. The user may input any combination of NAICS Codes in Box 30 from two to six digits and the Dashboard 4 dynamically determines which NAICS Code level to aggregate/display within the Sector Bubble Chart in pane 16.

Key NAICS Tool

The aforementioned Key NAICS Tool 19 allows the user to view the key or prominent NAICS Codes/industry sectors in any particular region. Key NAICS Codes are dynamically determined by an algorithm of the Dashboard 4 which compares the amount of employment, degree of regional specialization as measured by location quotient, and the desired average yearly salary as input by the user in Tool 19 across all the NAICS Codes in whatever region is currently selected. Upon execution of the algorithm via a "Go" button on the Tool 19, all aggregated statistics are displayed in the appropriate charts 14, 15, 20, 21, tables 22, 23 and graphs 33, the Sector Bubble Graph 16 is redrawn with just the specific key NAICS Codes which meet the algorithmic criteria, the NAICS Text Input Box 30 displays the string of specific Key NAICS Codes, and the Sector Filter Box 28 dynamically re-selects the resulting set of sectors.

Interactive Timeline

The aforementioned interactive timeline 31 provides a series of different "year buttons" 32, each of which when selected redraws all charts 14, 15, 16, 20, 21, tables 23, maps 17 and graphs 33 per the selected financial filters from Box 29, selected sectors from Box 28 and regions from Box 27 for the selected year, revealing a snapshot in time.

Integration with Business Outreach App

The IDV Dashboard 4 can be operated in a standalone mode, or can be integrated within a framework of apps 6 by way of a dynamic link 37 that connects IDV Dashboard 4 and a Business Outreach App 5. The aforementioned U.S. Pat. No. 10,380,616 describes a web-based Business Outreach interface, integrated with a CRM (customer relations management), facilitating a workflow associated with performing a highly targeted outreach coordinated among a small group of local business outreach staff who directly interact with local businesses.

For example, after retrieving a selection within a region per the Key NAICS Tool 19 and specific financial filters in Box 29, a user may then select the Business Outreach App button 37 and the Business Outreach App 5 will launch, using the IDV Dashboard 4 criteria to retrieve the business records from the table 7 (FIG. 3) that meet those criteria and depicting the retrieved records within the context of the tools for business outreach of the Business Outreach App 5. Specifically, any region(s) selected in the Box 27 of the IDV Dashboard 4 will be selected on the map in the Business Outreach App 5, any sectors chosen in the Box 28 of the IDV Dashboard 4 will be transferred to the Business Outreach App 5, any NAICS Codes displayed in the NAICS Text Input Box 30 will be re-input into the Business Outreach App 5, all Financial Filters from Box 29 will be re-selected in the Business Outreach App 5, etc. The Business Outreach App 5 will automatically focus the map thereof on the selected region and execute algorithms which retrieve all companies in the selected region meeting the criteria transferred from the IDV Dashboard 4. Note that while the IDV Dashboard 4 may limit the actual number of companies that can be retrieved to the largest fifty, the Business Outreach App 5 may nevertheless retrieve and display all companies matching the criteria, and may provide greater detail about the individual companies.

Method 1: Redraw IDV Dashboard Based Upon User Input

Figure 5:
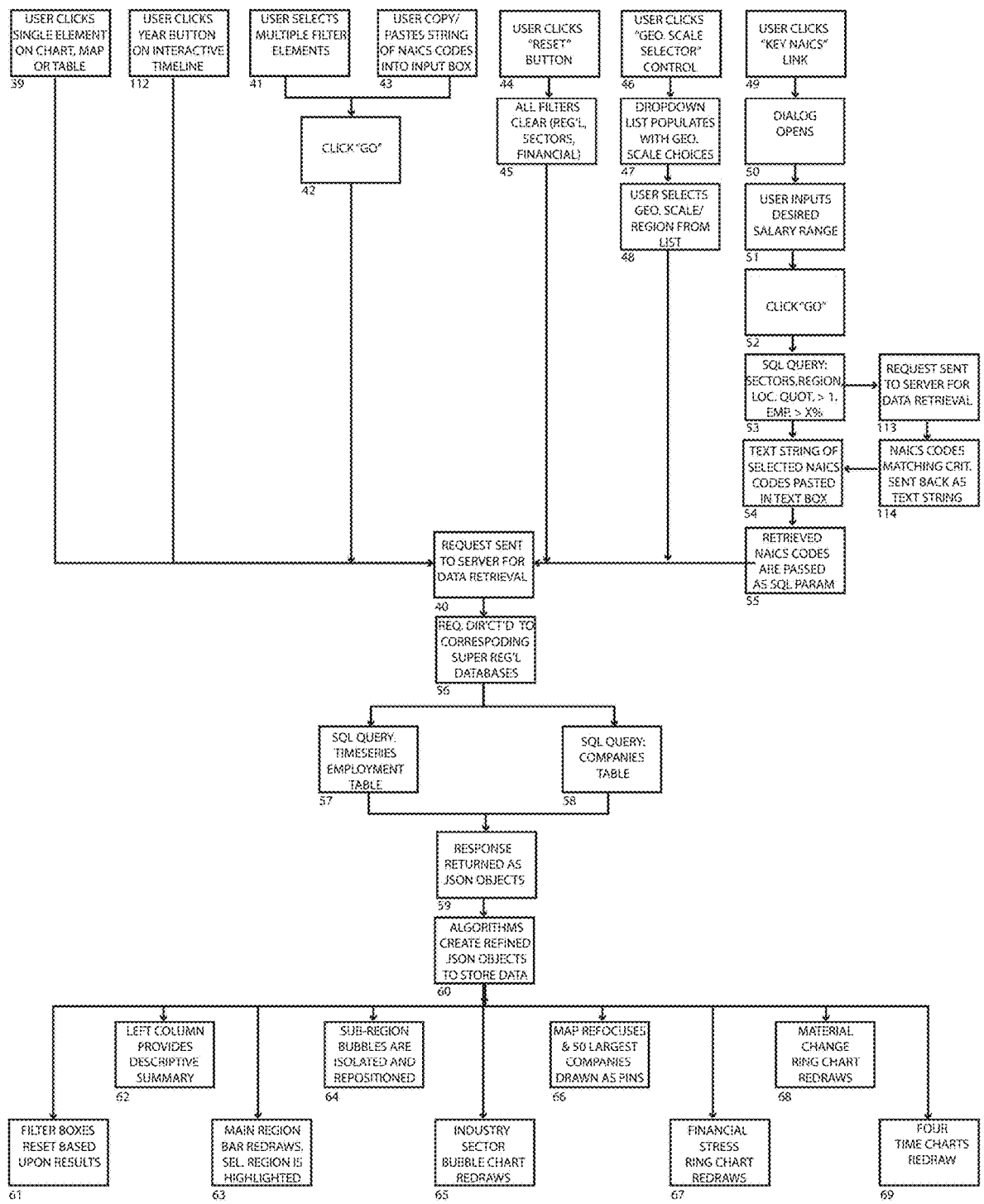
FIG. 5 is a flow diagram illustrating the method of redrawing the IDV Dashboard based upon user input in various embodiments of the present innovation.

Referring now to FIG. 5, it is to be appreciated that user input into the Dashboard 4 may occur in a variety ways. Once each input is received, information is retrieved from the databases 12 and the IDV Dashboard 4 is redrawn. Notably, the cycle of receiving input and redrawing the Dashboard 4 occurs in an iterative manner, so that the user interacts with the Dashboard 4 in an effort to focus and refine until the user is satisfied that the information displayed matches their needs.

The user may input query criteria through clicking on a single element or by inputting into a filter. User selections may include one or multiple items. These items may include regions, sectors, financial filters, or a year. Filtered input may occur through clicking a single element on any of the interactive charts, maps or tables (39). This type of input selection from a graph/map/chart sends "one filter" at a time. The query function is executed as soon as the user selects an item in this manner (40). Clicking a Year Button 32 on the Interactive Timeline 31 is another example of a "single" element selection (112). Upon clicking the year (112), a data retrieval is requested (40).

Filtered input may also occur by choosing many filters in any combination from the dropdown Multi-select Filter Boxes 27, 28, 29 at the top of the IDV Dashboard 4. Thus, a user may select any number and combination of regions, sectors and financial filters from the filter boxes (41). Once the criteria are identified, the user executes the function by clicking a "Go" button (42) which then sends the request to the server (40).

Filtered input may also occur by entering a string of NAICS Codes into the NAICS Text Input Box (43). Once input, the user executes the function by clicking a "Go" button (42) which then sends the request to the server (40).

Clicking the "Reset" Button 24 (44) is another type of filtered user input. In this case, such input causes all filters (regional, sectors, financial) to be cleared-out (45). After the filters are cleared, a request is sent to the database 12 (40).

A user may also input query criteria via the Geographical Scale Selector 38. Specifically, the user clicks on the Geographical Scale Selector 38 control (46) and a dropdown list appears (47) with a list of choices pertaining to the super/sub/local regional scale to be portrayed in the IDV Dashboard 4. Upon selection of the desired Geographical Scale (48), a data retrieval is prompted (40).

The "Key NAICS Tool" also serves as a user input mechanism. Specifically, a user clicks on the "Key NAICS Tool" button 18 (49). The associated dialog box 19 opens (50), asking the user to input a minimum salary (51). Upon clicking a "Go" button (52), SQL parameters are dynamically set (53), including the input salary, a location quotient greater than "1.0", and employment that is greater than X percent of the total employment in the selected region ("X" because the percentage is dynamically generated). These parameters are then sent to the database 12 for a data retrieval (113). Only NAICS Codes falling within the set parameters will be returned (114). Specifically, the data is returned as a text string that is then pasted into the NAICS Input Text Box 19 (54). Dynamically pasting the NAICS Codes in this way automatically passes this NAICS string as query parameters (55), prompting a subsequent query to be sent to the database 12 (40).

After user input is received and a request is sent to the database 12 as at 40, the request is routed to the appropriate super-region GIS databases (56). SQL queries are executed per the input filters, triggering a database retrieval from (1) a time series employment table summarized by six Digit NAICS code, sub-region and year (57) and (2) a table containing all current year companies in the super-region (58), organized by NAICS code and sub-region. The data is returned as JSON objects (59) is then run through a series of algorithms which dynamically re-summarize and aggregate/disaggregate the data into a more refined series of numeric client-side JSON objects which store the data (60). These numeric JSON objects then become the bases for the data visualization parameters in the dynamic and interactive charts, maps and tables of the Dashboard 4.

After the data has been organized into the appropriate numeric JSON objects 60, the following occurs simultaneously:

The top row Multi-Select Filter Boxes 27, 28, 29 dynamically select/reset their check boxes of regions, sectors and financial criteria based upon the selection criteria (61).

The Left Summary Column 13 lists a variety of characteristics of the selected region (62). Specifically, it lists descriptive attributes of the data, such as: the exact regions and sub-regions, the sectors and sub-sectors, the chosen financial filters, and specific year. Left Summary Column 13 also lists dynamically calculated statistics for the selection, including: total employment in the selection, the number of businesses, the average salary of the chosen sectors in the specified region, and the overall average location quotient of the chosen sectors in the selected region.

The Main Region Bar Chart in pane 14 is redrawn with any selected region bar(s) becoming highlighted (63), and the length of each region bar becoming adjusted based upon the amount of employment in that region.

The sub-region bubbles in the Sub-Region Bubble Chart in pane 15 are automatically placed/repositioned in the chart based upon the amount of employment in that sub-region and the average location quotient of that sub-region (64). This immediately reveals the relative prominence/importance of the sub-regions relative to each other and relative to the super-region. If any main-regions are selected, the corresponding sub-region bubbles are rendered as "isolated" at this time.

The Industry Sector Bubble Chart of pane 16 redraws (65), showing the main sectors in that region as bubbles, with each sector bubble automatically placed in the chart based upon the amount of employment in that sector and the calculated location quotient of that sector. This immediately reveals the relative prominence of the sectors relative to each other and relative to the super-region.

The Interactive Map of pane 17 focuses on the region that has been selected, and the fifty largest companies in that region per the selected sector and financial criteria are drawn as push pins on the map and listed in a selectable list (66).

The Financial Stress Ring Chart of pane 20 is redrawn (67) such that the amount of relative companies or employment in the selected region that are either low, medium or high financial stress are each respectively represented as segments in the ring chart.

The Material Change Ring Chart of pane 21 is redrawn (68) such that the amount of relative companies or employment in the selected region that are either contracting, remaining stable, or growing are each respectively represented as segments in the ring chart.

The four Time Graphs 33 on the bottom of the IDV Dashboard 4 are redrawn (69) as trend lines showing the respective amount of employment, number of businesses, average salary, location quotient across time for the selected region.

Method 2: Dynamically Generate a Detailed Multi-Page "One Button" PDF Report

Figure 6:
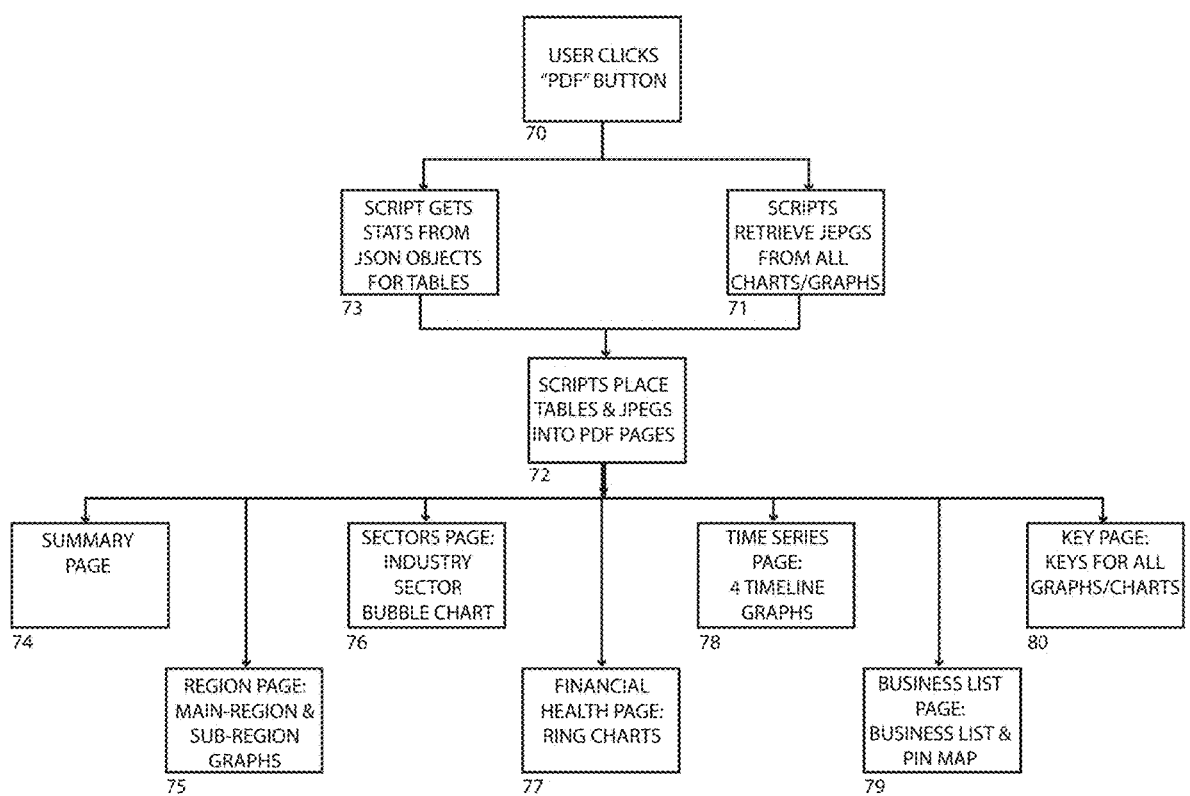
FIG. 6 is a flow diagram illustrating the method of dynamically generating a "one-button" PDF Report from the IDV Dashboard in various embodiments of the present innovation.

Referring now to FIG. 6, a user clicks the PDF Export Button 26 (70). This causes a series of algorithms to run which retrieve dynamically-generated jpeg screen-capture images of all charts, graphs and maps (71), dynamically redraw these images in a PDF format (72), and retrieve statistics from the numeric JSON objects to place within PDF textual tables (73). All tables and imagery are dynamically arranged within a series of PDF pages organized by topic (72). These pages include a main summary page (74), a page devoted to regions, including the regional bar and bubble charts from panes 14, 15 (75), a page devoted to sectors featuring the industry sector bubble chart from pane 16 (76), a page devoted to financial health featuring the two Financial Ring Charts from panes 20, 21 (77), a page devoted to time series including all four Time Series Graphs 33 (78), a page devoted to the map and list of the fifty largest companies from pane 17 (79), and a final page devoted to "Keys" for all chosen regions, sectors and financial stress criteria (80). The top of each page contains a statistical summary of the information.

Figure 7:
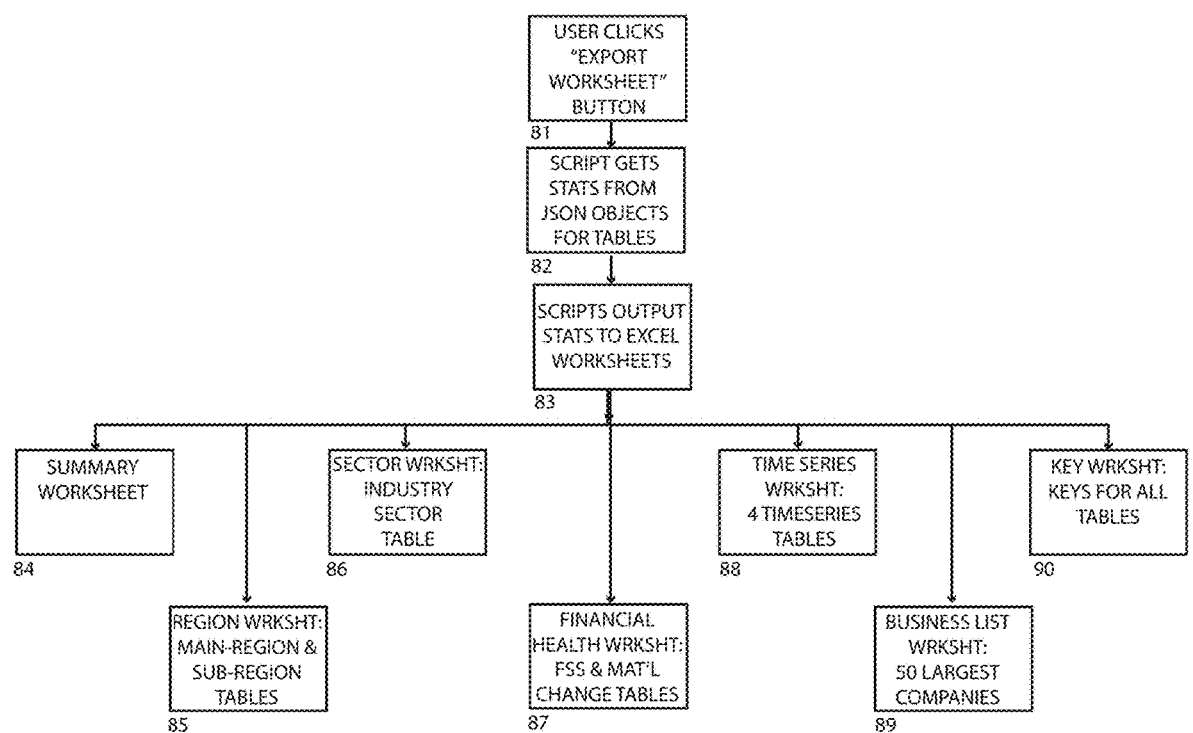
FIG. 7 is a flow diagram illustrating the method of dynamically generating a detailed multi-sheet "one-button" Excel Workbook from the IDV Dashboard in various embodiments of the present innovation.

Method 3: Dynamically Generate a Detailed Multi-Sheet "One Button" Excel Workbook Referring now to FIG. 7, a user clicks the Worksheet Export Button 25 (81). This causes a series of algorithms to run which retrieve statistics from the numeric JSON objects (82) and then dynamically redraw all statistics into an Excel tabular format (83). All tables are dynamically arranged within a series of tabbed spreadsheets (83) included within one Excel Workbook, with each spreadsheet organized by topic. These spreadsheets include: an overall summary sheet (84), a sheet devoted to regions (85), a sheet devoted to industry sectors (86), a sheet devoted to financial health (87), a sheet devoted to time series (88), a sheet devoted to the fifty largest companies (89), and a final sheet devoted to "Keys" (90) for all chosen regions, sectors and financial stress criteria. The top of each sheet contains a summary of the information included within that sheet. As may now be appreciated, the information in the Excel Workbook produced based on Button 25 is akin to the information in the PDF pages produced based on Button 26, although the PDF pages are more image-oriented while the Excel Workbook is more data-oriented.

Method 4: Subsectors/NAICS Radio Buttons

Figure 8:
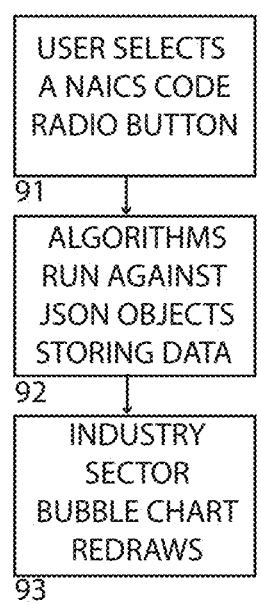
FIG. 8 is a flow diagram illustrating the method of dynamically switching between aggregated NAICS Codes in various embodiments of the present innovation.

Referring now to FIG. 8, a user selects the NAICS Code Radio Button within pane 16 (91), thereby indicating the manner in which to visualize industry sectors, as two Digit, three Digit, four Digit or six Digit NAICS code "sector" bubbles. This causes an algorithm to run which re-summarizes the numeric JSON objects based upon the desired NAICS Code grouping (92). This, in turn, causes the Industry Sector Bubble Chart to redraw itself as either more disaggregated bubbles or more aggregated bubbles (93).

Figure 9:
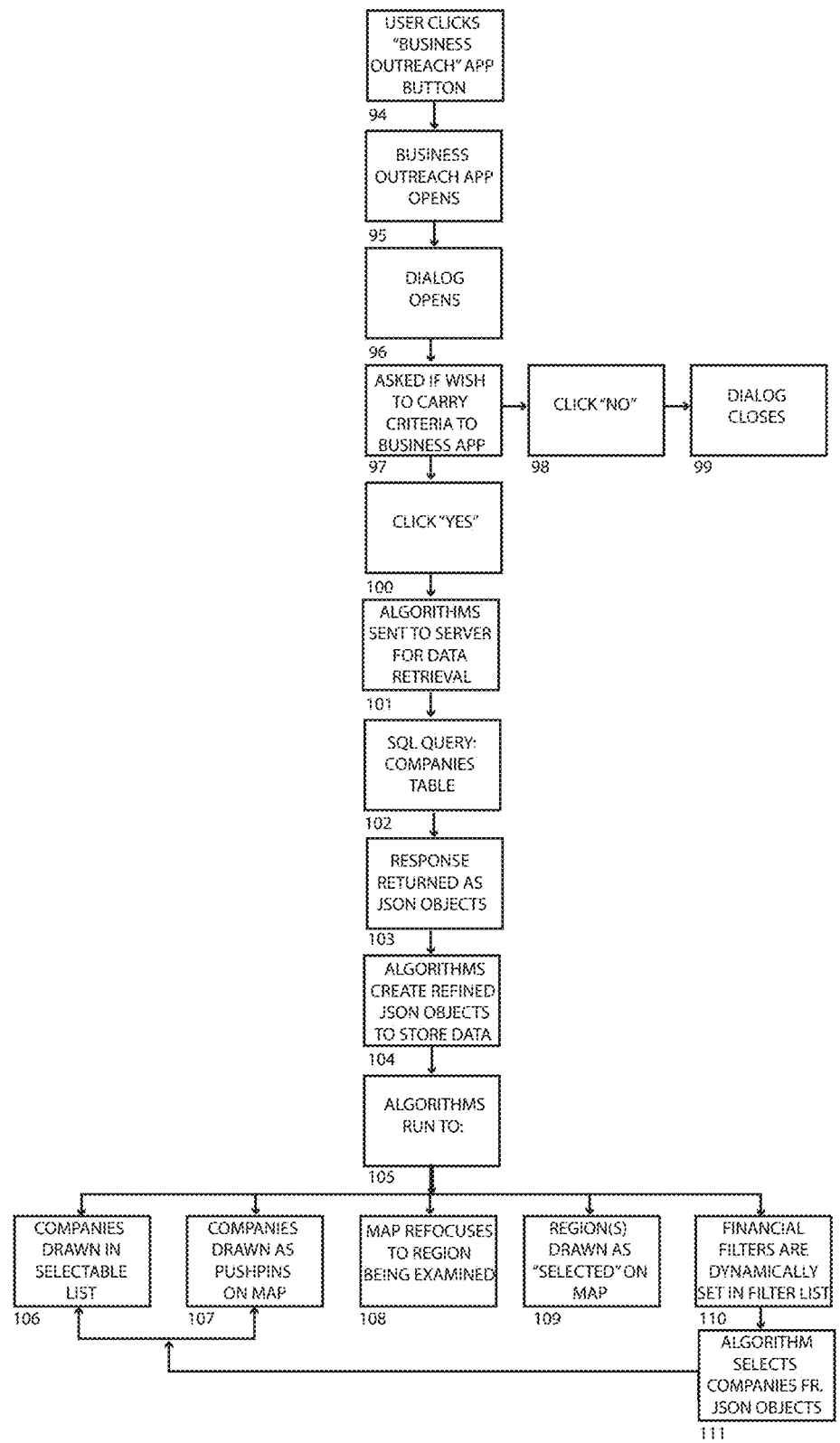
FIG. 9 is a flow diagram illustrating the method of transporting IDV Dashboard criteria to a companion Business Outreach App and dynamically selecting, filtering and rendering the companies matching the criteria in the Business Outreach App in various embodiments of the present innovation.

Method 5: Transporting IDV Dashboard Criteria to the Business Outreach App and Dynamically Selecting, Filtering and Rendering the Companies Matching the Criteria in the Business Outreach App Referring now to FIG. 9, a user clicks a "Business Outreach App" button 34 (94) causing the business outreach platform to launch the corresponding Business Outreach App 5. The App 5 opens (95), and a dialog appears (96) asking the user if they wish to carry their criteria over into the App 5 in order to view the criteria in the Business Outreach App 5 (97). Upon clicking "no" (98), the dialog will close (99). Upon clicking "yes" (100), a series of algorithms will run causing the Business Outreach App 5 to run a database retrieval (101) of all of the businesses in those region(s) which meet the selected sector(s) criteria (102). Upon retrieval of the business data as JSON Objects (103), the Business Outreach App 5 runs a series of algorithms to further refine the results in a series of JSON Objects which store the data (104). After this, more client-side algorithms run (105) which put the businesses in a selectable list (106), render them as pushpins on a map (107), refocus the map on the selected region(s) (108), render the region(s) as "selected" on the map (109) and dynamically select the filters of the Business Outreach App 5 to reflect those carried over from the IDV Dashboard 4 (110). As may be appreciated, the filters carried over may include size of company, chosen NAICS Codes, Financial criteria, etc. After dynamically selecting these criteria in the Business Outreach App 5 as at 110, the Business Outreach App 5 subsequently runs an algorithm that isolates the specific businesses matching the filters (111), and specifically renders those companies on both the map of the Business Outreach App (207) and in the selectable list thereof (206).

Summation

As should be appreciated, the Dashboard 4 and related systems and methods of the present innovation are not merely for identifying companies at risk of failure. Rather, the Dashboard 4 and related systems and methods are tools for accurately seeing and probing the fluidity of an economy in a geographic locale or the like. While an economy is at a basic level a collection of companies in such a locale, such economy is at a higher level a view of the types of the companies (perhaps represented in terms of industry and/or employment sectors, which are identifiable based on NAICS codes), how the companies interact with one another (perhaps in the context of buyer/supplier relationships), how the companies relate to the local population (whether they find employees locally or have to entice employees to move from remote locations) and how the companies in the locale relate to those in the neighboring locales and the economies thereof (again, perhaps in the context of buyer/supplier relationships). The health of the companies in an economy matters, as should be evident. A failure of a company can result in both layoffs and broken supply chains, with effects that likely will cascade both within the local economy of the company and also within the economies of neighboring locales, if not further. Correspondingly, an expansion of a company can result in both increased employment and a growth in related supply chains, with effects that likely will also cascade both within the local economy of the company and also within the economies of neighboring locales, if not further. Notably, an expansion of a company means the local population may find increased employment, but only if residents are trained in the appropriate skillsets. Likewise, such an expansion means supply chain growth, but only if suppliers are properly capitalized and otherwise capable of servicing the requirements of the company, among other things.

With the Dashboard 4 and related systems and methods, these issues and other related issues can be probed quickly and easily, and the results can be acted on promptly. In particular, the Dashboard 4 visualizes a super-region economy and allows a user to identify industry sectors and sub-regions with companies either at risk of failure or showing signs of growth and expansion, among other things. The Dashboard 4 simultaneously portrays an overall economy and its component parts, from statistics aggregated by region, sector and financial health to the actual companies which compose the "raw data" for those statistics.

The Dashboard 4 is not merely for finding failing companies, but instead is employed to allow a user to understand the fundamentals or essence of the economy in a region in order to strategically focus on those companies that require some form of attention and/or help, be it in a positive sense, a negative sense, or otherwise. Based on being able to accurately identify such companies, the user can quickly and effectively work with the precise companies that should be targeted.

As a first example, consider a user interested in finding living wage industries in an expensive regional economy. A consortium of businesses, policy makers, economic developers, service providers and educators in a particular geographic area aims to partner with local companies in industry sectors which provide a 'living wage' such that the local community colleges can develop whatever curricula are needed for assisting local residents to attain the skills necessary to work for these local companies in these industry sectors. Currently, the local population is mainly working in low-paying wage sectors, and thus will likely not be able to continue to reside in the region due to low-paying wages. In a desire to expand the range of occupations and increase salaries for the local population, the consortium wants to probe local companies, reach out to those local companies that are not currently affiliated with the usual business networks (e.g., the local Chamber of Commerce), and partner with those un-affiliated local companies in working to train the local population for more sustainable careers in the region.

In such first example, a user might employ the Key NAICS Tool 19 of the Dashboard 4 to quickly retrieve a list of NAICS Codes and corresponding companies which match an inputted desired salary level. The retrieved NAICS Codes would automatically feature a high Location Quotient and large amount of employment in the region. The user can then further refine the criteria to find just those companies and/or sectors which are Low Financial Stress and showing behaviors associated with growth as these companies/sectors make good partners for developing the curricula and in offering apprenticeships and on-the-job training. The combination of the Dashboard 4 and other apps 5 would then provide the company list and the key NAICS codes that the consortium would focus upon. Notably, the user can select an appropriate granularity for searching, and for example might search by a sub-region rather than a region if the sub-regions are relatively large and yet distinctive from each other.

As a second example, consider a user interested in examining how an especially wide-spread forest fire has affected a geographic area economically. Here, the super-region might include multiple rural counties in a state, each county might be a region, and the sub-regions might include each municipality in each county and the surrounding unincorporated areas. Inasmuch as the especially wide-spread forest fire likely stretched across many sub-regions and regions without respecting the boundaries thereof, focusing from the super-region down is appropriate. Here, the user may employ the Dashboard 4 to examine quarterly snapshots of all these regional economies. Notably, such snapshots over time may reveal both the loss of businesses and also the advent of a new albeit transient economy driven by the many companies that would relocate into the geographic area to assist in rebuilding. In this context, Interactive Timeline 31 of the Dashboard 4 would be very revealing to the user. In particular, by dynamically redrawing the Timeline 31 whenever a different region, industry sector, etc. is selected, the user would be able to easily spot and act upon the nuanced growths and declines by industry sector and locale. Those showing growth would be available to provide employment opportunities for local residents. Correspondingly, those that are in decline could be targeted for available assistance, such as emergency loans and rebuilding grants, among other things.

CONCLUSION

The programming believed necessary to effectuate the processes performed in connection with the various embodiments of the present innovation is relatively straight-forward and should be apparent to the relevant programming public. Accordingly, such programming is not attached hereto. Any particular programming, then, may be employed to effectuate the various embodiments of the present innovation without departing from the spirit and scope thereof.

In the present innovation, a method and mechanism are set forth for providing an enhanced web-based mapping interface/dashboard 4 that facilitates a data-backed decision-making framework. The method and mechanism simultaneously manage the decision-making workflow from super-regional administrators, regional administrators, and even on-the-ground local staff who are knocking on the doors of affected businesses. The integrated interactive data visualization dashboard 4 provides the ability to get a cross-scale, multi-regional comparison of the health of the economy of a designated super-region across time for use by all such individuals.

It should be appreciated that changes could be made to the embodiments described above without departing from the innovative concepts thereof. For example, although the present innovation is set forth primarily in terms of granularities of generic super-regions, regions, and sub-regions, it is to be understood that specific granularities may also be applied, such as for example political states, counties, and cities, or non-political geographic identifiers, among other things. Likewise, although the present innovation is set forth at least partially in terms of data procured from certain sources, such as for example data and/or databases that are obtained from Dun & Bradstreet (D&B), it is to be understood that such data may be procured from other sources, presuming that the data is appropriately formatted and organized. It should be understood, therefore, that this innovation is not limited to the particular embodiments disclosed, but it is intended to cover modifications within the spirit and scope of the present innovation as defined by the appended claims.

The invention claimed is:

1. A computer-based system for providing an enhanced web-based mapping interface that facilitates a data-backed decision-making framework, the system comprising a computing device including a display and a processor operating based on data in a memory, the system further comprising:
    an interactive data visualization dashboard instantiated in the memory and shown in the display, the dashboard for visualizing a super-region economy and allowing a user to identify companies of interest, the dashboard accessing information from a database connected thereto, the database containing all companies in the super-region and for each company therein information therefor including employment, salaries, and location information, the dashboard including:
    a user-actuatable control for allowing a user to select a desired super-region, main-region, and sub-region relationship to be portrayed in the dashboard;
    a main region chart portraying main regions in a super-region, each main region therein being displayed according to an amount of employment in such main region;
    a sub-region chart representing sub-regions within the main regions depicted in the main region chart, each sub-region therein being displayed according to an amount of sub-regional employment for the sub-region;
    an industry sector chart of industry sectors that can be drilled down from more generic levels of industry sector codes to more specific level of industry sector codes, the industry sector chart representing selected sectors from a selected region, each sector therein being displayed according to an amount of employment in the sector within the selected region;
    a financial stress chart depicting a financial stress index for the selected region, including a number of companies and employment that fall within categories of low, medium or high financial stress as defined by the index, the financial stress index representing a projected status of companies in the selected region; and
    a material change chart depicting a material change score for the selected region, including a number of companies and employment distributed across categories of contracting, growing or stable as defined by the score, the material change score representing a current financial status of companies in the selected region,
    all of the charts being interactive and linked to each other so that a selection of an element in one chart automatically triggers all other charts to redraw based upon the selected element, the selection of an element and redrawing the charts based thereupon occurring in an iterative manner, whereby the user interacts with the dashboard in an effort to focus and refine until the user is satisfied with the information displayed,
    the industry sector chart further displaying each sector according to a location quotient for the sector in the selected region, each location quotient comparing the sector to the selected region in terms of share of industry sectoral employment, a location quotient of "1.0" meaning that the sector and selected region have an identical share of employment, a location quotient greater than "1.0" meaning that the sector has a greater share of employment in the selected region.

2. The system of claim 1 wherein the dashboard further displays an interactive timeline with a plurality of buttons each representing a temporal chronologically sorted element, each button upon being selected causing the dashboard to redraw all charts therein according to a timeframe corresponding to the temporal element of the selected button.

3. The system of claim 1 wherein the dashboard further displays a series of linear time graphs depicting how any particular user selection fares across time in any selected region per number of businesses, amount of employment, average salary and average location quotient.

4. The system of claim 1 wherein the dashboard further displays user-actuatable filter controls for allowing a user to select geographic regions, employment sectors, and financial health criteria, and an aggregated summary of employment sectors, geographic regions, and financial health criteria selected by the user.

5. A computer-based method employing an enhanced web-based mapping interface that facilitates a data-backed decision-making framework, the method being performed by a computing device including a display and a processor operating based on data in a memory, the method comprising:
    instantiating an interactive data visualization dashboard in the memory and showing same in the display, the dashboard for visualizing a super-region economy and allowing a user to identify companies of interest, the dashboard accessing information from a database connected thereto, the database containing all companies in the super-region and for each company therein information therefor including employment, salaries, and location information;
    allowing a user to select, from a user-actuatable control of the dashboard, a desired super-region, main-region, and sub-region relationship to be portrayed in the dashboard;
    displaying, in a main region chart portraying main regions in a super-region, each main region according to an amount of employment in such main region;
    displaying, in a sub-region chart representing sub-regions within the main regions depicted in the main region chart, each sub-region according to an amount of sub-regional employment for the sub-region;
    displaying, in an industry sector chart of industry sectors that can be drilled down from more generic levels of industry sector codes to more specific level of industry sector codes, the industry sector chart representing selected sectors from a selected region, each sector according to an amount of employment in the sector within the selected region;
    displaying, in a financial stress chart depicting a financial stress index for the selected region, including a number of companies and employment that fall within categories of low, medium or high financial stress as defined by the index, the financial stress index representing a projected status of companies in the selected region;

displaying, in a material change chart depicting a material change score for the selected region, including a number of companies and employment distributed across categories of contracting, growing or stable as defined by the score, the material change score representing a current financial status of companies in the selected region;

linking all of the charts to each other, the charts being interactive;

receiving a selection of an element in one chart, and automatically triggering all other charts to redraw based upon the selected element, the selection of an element and redrawing the charts based thereupon occurring in an iterative manner, whereby the user interacts with the dashboard in an effort to focus and refine until the user is satisfied with the information displayed; and displaying, in the sub-region chart, each sub-region according to an overall average of location quotients across all employment sectors for the sub-region, each location quotient comparing the sub-region to the main region thereof in terms of share of industry sectoral employment, a location quotient of "1.0" meaning that the sub-region and main region thereof have an identical share of employment in a selected sector, a location quotient greater than "1.0" meaning that the sub-region has a greater share of employment in the selected sector relative to the main region.

6. The method of claim 5 further comprising allowing, by way of a user-actuatable toggle in each chart, the user to switch between a display of the chart and underlying raw data from which the chart is produced.

7. The method of claim 5 further comprising displaying in the dashboard an interactive timeline with a plurality of buttons each representing a temporal chronologically sorted element, and upon receiving a selection of each button redrawing all charts in the dashboard according to a timeframe corresponding to the temporal element of the selected button.

8. The method of claim 5 further comprising displaying in the dashboard a series of linear time graphs depicting how any particular user selection fares across time in any selected region per number of businesses, amount of employment, average salary and average location quotient.

9. The method of claim 5 further comprising displaying in the dashboard an interactive map and list depicting a number of largest companies matching input criteria.

10. The method of claim 5 further comprising displaying in the dashboard user-actuatable filter controls for allowing a user to select geographic regions, employment sectors, and financial health criteria, and an aggregated summary of employment sectors, geographic regions, and financial health criteria selected by the user.

11. The method of claim 10 wherein the aggregated summary includes specific regions, sectors, financial health criteria and years that are selected by the user while performing an analysis, the aggregated sum of employment and businesses in such selection, and the average salary and location quotient for such selection.

12. The method of claim 5 comprising receiving a selection of a sector in the industry sector chart, and drilling into the selected sector by redrawing the industry sector chart at a next level of dis-aggregation.

13. A computer-based method employing an enhanced web-based mapping interface that facilitates a data-backed decision-making framework, the method being performed by a computing device including a display and a processor operating based on data in a memory, the method comprising:

instantiating an interactive data visualization dashboard in the memory and showing same in the display, the dashboard for visualizing a super-region economy and allowing a user to identify companies of interest, the dashboard accessing information from a database connected thereto, the database containing all companies in the super-region and for each company therein information therefor including employment, salaries, and location information;

allowing a user to select, from a user-actuatable control of the dashboard, a desired super-region, main-region, and sub-region relationship to be portrayed in the dashboard;

displaying, in a main region chart portraying main regions in a super-region, each main region according to an amount of employment in such main region;

displaying, in a sub-region chart representing sub-regions within the main regions depicted in the main region chart, each sub-region according to an amount of sub-regional employment for the sub-region;

displaying, in an industry sector chart of industry sectors that can be drilled down from more generic levels of industry sector codes to more specific level of industry sector codes, the industry sector chart representing selected sectors from a selected region, each sector according to an amount of employment in the sector within the selected region;

displaying, in a financial stress chart depicting a financial stress index for the selected region, including a number of companies and employment that fall within categories of low, medium or high financial stress as defined by the index, the financial stress index representing a projected status of companies in the selected region;

displaying, in a material change chart depicting a material change score for the selected region, including a number of companies and employment distributed across categories of contracting, growing or stable as defined by the score, the material change score representing a current financial status of companies in the selected region;

linking all of the charts to each other, the charts being interactive;

receiving a selection of an element in one chart, and automatically triggering all other charts to redraw based upon the selected element, the selection of an element and redrawing the charts based thereupon occurring in an iterative manner, whereby the user interacts with the dashboard in an effort to focus and refine until the user is satisfied with the information displayed; and displaying, in the industry sector chart, each sector according to a location quotient for the sector in the selected region, each location quotient comparing the sector to the selected region in terms of share of industry sectoral employment, a location quotient of "1.0" meaning that the sector and selected region have an identical share of employment, a location quotient greater than "1.0" meaning that the sector has a greater share of employment in the selected region.

14. The method of claim 13 further comprising allowing, by way of a user-actuatable toggle in each chart, the user to switch between a display of the chart and underlying raw data from which the chart is produced.

15. The method of claim 13 further comprising displaying in the dashboard an interactive timeline with a plurality of buttons each representing a temporal chronologically sorted element, and upon receiving a selection of each button redrawing all charts in the dashboard according to a timeframe corresponding to the temporal element of the selected button.

16. The method of claim 13 further comprising displaying in the dashboard a series of linear time graphs depicting how any particular user selection fares across time in any selected region per number of businesses, amount of employment, average salary and average location quotient.

17. The method of claim 13 further comprising displaying in the dashboard an interactive map and list depicting a number of largest companies matching input criteria.

18. The method of claim 13 further comprising displaying in the dashboard user-actuatable filter controls for allowing a user to select geographic regions, employment sectors, and financial health criteria, and an aggregated summary of employment sectors, geographic regions, and financial health criteria selected by the user.

19. The method of claim 18 wherein the aggregated summary includes specific regions, sectors, financial health criteria and years that are selected by the user while performing an analysis, the aggregated sum of employment and businesses in such selection, and the average salary and location quotient for such selection.

20. The method of claim 13 comprising receiving a selection of a sector in the industry sector chart, and drilling into the selected sector by redrawing the industry sector chart at a next level of dis-aggregation.

* * * * *